US009248922B1

(12) United States Patent
Baghdasarian et al.

(10) Patent No.: US 9,248,922 B1
(45) Date of Patent: Feb. 2, 2016

(54) REFLECTOR DEPLOYMENT TECHNIQUES FOR SATELLITES

(75) Inventors: Varouj G. Baghdasarian, Cupertino, CA (US); Walter S. Gelon, Redwood City, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 977 days.

(21) Appl. No.: 13/215,932

(22) Filed: Aug. 23, 2011

(51) Int. Cl.
*B64G 1/22* (2006.01)

(52) U.S. Cl.
CPC .................................. *B64G 1/222* (2013.01)

(58) Field of Classification Search
USPC ........................................... 244/172.6, 173.3
See application file for complete search history.

(56) References Cited

U.S. PATENT DOCUMENTS

| | | | |
|---|---|---|---|
| 3,576,566 A | | 4/1971 | Cover et al. |
| 3,652,042 A | * | 3/1972 | Welther .................... 244/173.3 |
| 4,384,692 A | | 5/1983 | Preukschat |
| 4,480,415 A | * | 11/1984 | Truss ............................ 52/108 |
| 4,508,297 A | | 4/1985 | Mouilhayrat et al. |
| 4,561,614 A | * | 12/1985 | Olikara et al. ............. 244/172.6 |
| 4,587,777 A | * | 5/1986 | Vasques et al. ................ 52/108 |
| 4,634,086 A | | 1/1987 | Mori |
| 4,725,025 A | * | 2/1988 | Binge et al. ................ 244/172.6 |
| 5,129,601 A | | 7/1992 | Henkel |
| 5,253,827 A | | 10/1993 | Funk et al. |
| 5,527,001 A | * | 6/1996 | Stuart ........................ 244/159.4 |
| 5,833,175 A | | 11/1998 | Caplin |
| 5,963,182 A | | 10/1999 | Bassily |
| 5,969,695 A | | 10/1999 | Bassily et al. |
| 5,996,940 A | | 12/1999 | McVey et al. |
| 6,384,800 B1 | | 5/2002 | Bassily et al. |
| 6,424,314 B1 | | 7/2002 | Baghdasarian et al. |
| 6,448,940 B1 | * | 9/2002 | Chiang ........................ 343/882 |
| 6,669,147 B2 | | 12/2003 | Bertheux et al. |
| 6,768,582 B1 | * | 7/2004 | Hachkowski et al. ........ 359/399 |
| 7,104,506 B1 | | 9/2006 | Goodzeit et al. |
| 7,180,470 B1 | * | 2/2007 | Hentosh ....................... 343/882 |
| 7,602,349 B2 | * | 10/2009 | Hentosh et al. ............... 343/882 |
| 7,714,797 B2 | * | 5/2010 | Couchman et al. ........... 343/881 |
| 8,448,902 B2 | | 5/2013 | Gelon et al. |
| 8,496,209 B2 | * | 7/2013 | Chaix et al. ................ 244/172.6 |
| 2002/0145082 A1 | | 10/2002 | Bertheux et al. |

(Continued)

FOREIGN PATENT DOCUMENTS

EP    780294    6/1997
EP    2617099   7/2013

(Continued)

OTHER PUBLICATIONS

U.S. Appl. No. 61/383,672, filed Sep. 16, 2010, entitled "High Capacity Broadband Satellite", by Walter Gelon et al.

(Continued)

*Primary Examiner* — Brian M O'Hara
*Assistant Examiner* — Keith L Dixon
(74) *Attorney, Agent, or Firm* — Weaver Austin Villeneuve & Sampson

(57) ABSTRACT

A high capacity satellite having a launch configuration in which one or more antenna reflectors may be stored forward of a forward surface of the spacecraft and an on-orbit configuration in which a reflector boom may be rotated to displace the one or more antenna reflectors a substantial distance from the main body in the yaw axis direction and in a direction orthogonal to the yaw axis direction.

28 Claims, 12 Drawing Sheets

(56) References Cited

U.S. PATENT DOCUMENTS

| | | |
|---|---|---|
| 2003/0057328 A1 | 3/2003 | Maruno et al. |
| 2008/0111031 A1 | 5/2008 | Mobrem |
| 2008/0143636 A1 | 6/2008 | Couchman et al. |
| 2012/0068019 A1 | 3/2012 | Boccio |

FOREIGN PATENT DOCUMENTS

| | | |
|---|---|---|
| FR | 2476018 | 8/1981 |
| FR | 2522614 | 9/1983 |
| JP | 10209747 | 8/1998 |
| RU | 2092398 | 10/1997 |
| WO | 2012-036863 | 3/2012 |
| WO | 2012-108908 | 8/2012 |

OTHER PUBLICATIONS

U.S. Appl. No. 13/101,944, filed May 5, 2011, entitled "High Capacity Broadband Satellite", by Joel Francis Boccio et al.

U.S. Appl. No. 13/026,175, filed Feb. 11, 2011, entitled "Satellite Having Multiple Aspect Ratios," by Walter Gelon.

U.S. Appl. No. 13/215,929, filed Aug. 23, 2011, entitled "Extendable Antenna Reflector Deployment Techniques," by Varouj G. Baghdasarian.

U.S. Office Action in U.S. Appl. No. 13/101,944 dated Dec. 31, 2012.

U.S. Final Office Action in U.S. Appl. No. 13/101,944 dated Apr. 11, 2013.

U.S. Office Action in U.S. Appl. No. 13/101,944 dated Aug. 30, 2013.

U.S. Notice of Allowance in U.S. Appl. No. 13/101,944 dated Apr. 2, 2014.

U.S. Office Action in U.S. Appl. No. 13/026,175 dated Oct. 11, 2012.

U.S. Notice of Allowance in U.S. Appl. No. 13/026,175 dated Feb. 20, 2013.

U.S. Office Action in U.S. Appl. No. 13/215,929 dated Dec. 18, 2013.

PCT International Search Report and Written Opinion dated Dec. 29, 2011 issued in PCT/US2011/049183.

PCT International Preliminary Report on Patentability dated Mar. 19, 2013 issued in PCT/US2011/049183.

PCT International Search Report and Written Opinion dated Jan. 17, 2012 issued in PCT/US2011/049190.

PCT International Preliminary Report on Patentability dated Aug. 13, 2013 issued in PCT/US2011/049190.

Persinger et al. The Intelsat VI Antenna System Comsat Technical Review, Communications Satellite Corporation, vol. 21, No. 1, Mar. 1, 1991, pp. 149-187.

Wilson et al. Future Radiometer Systems for Earth Remote Sensing Microwave Symposium Digest, 1999 IEEE MTT-S Jun. 13, 1999 pp. 395-398.

\* cited by examiner

REFLECTOR DEPLOYMENT TECHNIQUES FOR SATELLITES

TECHNICAL FIELD

This invention relates generally to a spacecraft providing communications and/or broadcast service, and particularly to antenna reflector packaging and deployment mechanisms for such a spacecraft.

BACKGROUND OF THE INVENTION

The assignee of the present invention manufactures and deploys spacecraft for, inter alia, communications and broadcast services. Market demands for such spacecraft have imposed increasingly stringent requirements on spacecraft payload operational capacity. For example, rigid antenna reflector systems characterized by large reflector apertures and long focal lengths are increasingly needed to improve payload operational capacity.

Launch vehicle compatibility is a second requirement faced by a spacecraft designer. The increased performance requirements are only advantageously met if compatibility with conventional, commercially available launch vehicles is maintained. Accordingly, a spacecraft, as configured for launch, is desirably made compatible with the mass properties and fairing envelope constraints of such launch vehicles as, for example, Ariane V, Atlas XEPF, Proton, and Sea Launch. Commonly-assigned patent application Ser. No. 13/101,944, titled "High Capacity Broadband Satellite," and Ser. No. 13/026,175, titled "Satellite Having Multiple Aspect Ratios," disclose additional information regarding the above-mentioned problems, and are hereby incorporated by reference in their entireties.

In view of the foregoing, there is a need for a spacecraft capable of supporting higher-gain rigid antenna reflector systems while still fitting within the fairing envelopes of existing launch vehicles.

SUMMARY OF INVENTION

The present inventors have appreciated that a rigid antenna reflector having a large focal length may be packaged on a spacecraft within conventional launch vehicle fairing envelope by providing that, in a launch configuration, the antenna reflector is stored forward of the forward surface of the spacecraft, and that, in the deployed, i.e., on-orbit, configuration, the antenna reflector is displaced a substantial distance in the yaw axis direction and a substantial distance in a direction perpendicular to the yaw axis direction.

Such a design may be implemented, for example, using a reflector boom which is mounted to the main body of the spacecraft and configured to be rotated about a pivot and positioned, in the launch configuration, substantially proximate and substantially parallel to the main body and an antenna reflector which is configured to be rotated by a positioning mechanism such that the antenna reflector aperture plane is substantially parallel to the spacecraft yaw axis and such that the antenna reflector is positioned forward of the forward surface in order to place the spacecraft in a launch configuration. To support placing the spacecraft in an on-orbit location, the reflector boom may be further configured to be rotated through a substantial angle about the pivot away from the main body and the antenna reflector may be configured to be rotated outboard from the spacecraft and displaced a substantial distance in the yaw axis direction and a substantial distance in a direction perpendicular to the yaw axis direction. Such an implementation may allow for the antenna feed for the antenna reflector to be positioned approximately mid-way between the forward and aft surfaces of the main body rather than near the forward or aft surface of the main body.

In one embodiment, a spacecraft reconfigurable between a launch configuration and an on-orbit configuration is provided. The spacecraft may include a forward surface, an aft surface, a main body disposed between the forward surface and the aft surface, and a rigid antenna reflector. The rigid antenna reflector may be stored, in the launch configuration, forward of the forward surface, and displaced, in the on-orbit configuration, substantially outboard of the main body and displaced substantially aft of the of the aft surface.

In a further embodiment, the spacecraft may include a mechanism configured to move the rigid antenna reflector between the launch configuration and the on-orbit configuration.

In some embodiments, a spacecraft is provided which is reconfigurable between a launch configuration and an on-orbit configuration. The spacecraft may include a forward surface and an aft surface, each substantially orthogonal to the spacecraft yaw axis, a main body disposed between the forward surface and the aft surface, a first rigid antenna reflector, the first rigid antenna reflector coupled with a first positioning mechanism and associated with a first antenna feed, the first antenna feed configured to illuminate the first rigid antenna reflector when the spacecraft is in the on-orbit configuration, and a first reflector boom with a first proximal end and a first distal end, the first proximal end coupled with the main body via a first pivot and the first distal end coupled with the first rigid antenna reflector via the first positioning mechanism. The first reflector boom may be configured to rotate about the first pivot. In the launch configuration, the aperture plane of the first rigid antenna reflector is substantially parallel to the spacecraft yaw axis, and a substantial portion of the first rigid antenna reflector is forward of the forward surface and inboard of the main body. In the on-orbit configuration, the first reflector boom is at a substantial angle with respect to the main body, the aperture plane of the first rigid antenna reflector is substantially parallel to the rotational axis of the first pivot, the first rigid antenna reflector is illuminated by the first antenna feed, and the first rigid antenna reflector is displaced a substantial distance from the main body in the yaw axis direction and in a direction orthogonal to the yaw axis direction.

In some embodiments, the first positioning mechanism of the spacecraft may be configured to rotate the first antenna reflector relative to the first reflector boom.

In some embodiments, in the launch configuration, the first reflector boom is substantially proximate to and substantially parallel to the main body. In some embodiments, in the launch configuration, the aperture plane of the first rigid antenna reflector is substantially normal to the rotational axis of the first pivot.

In some embodiments, the spacecraft may further include a second rigid antenna reflector, the second rigid antenna reflector coupled with a second positioning mechanism and associated with a second antenna feed, the second antenna feed configured to illuminate the second rigid antenna reflector when the spacecraft is in the on-orbit configuration, and a second reflector boom with a second proximal end and a second distal end, the second proximal end coupled with the main body via a second pivot and substantially opposite of the first pivot and the second distal end coupled with the second rigid antenna reflector via the second positioning mechanism. The second reflector boom may be configured to rotate about the second pivot. In the launch configuration, the aperture plane of the second rigid antenna reflector is substantially parallel to the spacecraft yaw axis, and the second rigid antenna reflector is forward of the forward surface and inboard of the main body. In the on-orbit configuration, the second reflector boom is at a substantial angle with respect to the main body, the aperture plane of the second rigid antenna reflector is substantially parallel to the rotational axis of the second pivot, the second rigid antenna reflector is illuminated by the second antenna feed, and the second rigid antenna reflector is displaced a substantial distance from the main body in the yaw axis direction and in a direction orthogonal to the yaw axis direction.

In further embodiments, the spacecraft may include a third rigid antenna reflector, the third rigid antenna reflector coupled with a third positioning mechanism and associated with a third antenna feed configured to illuminate the third rigid antenna reflector when the spacecraft is in the on-orbit configuration, wherein the third rigid antenna reflector may be coupled with the first distal end via the third positioning mechanism, and a fourth rigid antenna reflector, the fourth rigid antenna reflector coupled with a fourth positioning mechanism and associated with a fourth antenna feed configured to illuminate the fourth rigid antenna reflector when the spacecraft is in the on-orbit configuration, wherein the fourth rigid antenna reflector may be coupled with the second distal end via the fourth positioning mechanism. In the launch configuration, the aperture planes of the third rigid antenna reflector and the fourth rigid antenna reflector are substantially parallel to the spacecraft yaw axis, and a substantial portion of the third rigid antenna reflector and a substantial portion of the fourth rigid antenna reflector are forward of the forward surface and inboard of the main body. In the on-orbit configuration, the aperture planes of the third rigid antenna reflector and the fourth rigid antenna reflector are substantially parallel to the rotational axes of the first pivot and the second pivot, respectively, the third rigid antenna reflector is illuminated by the third antenna feed, the fourth rigid antenna reflector is illuminated by the fourth antenna feed, and the third rigid antenna reflector and the fourth rigid antenna reflector are displaced a substantial distance from the main body in the yaw axis direction and in directions orthogonal to the yaw axis direction.

In some embodiments, the spacecraft may further include a first crossboom, the first crossboom connected with the first positioning mechanism at a first end of the first crossboom, the first crossboom connected with the third positioning mechanism at a second end of the first crossboom, and the first crossboom connected with the first distal end between the first end and the second end of the first crossboom, wherein the first rigid antenna reflector and the third rigid antenna reflector are coupled with the first distal end via the first crossboom. The spacecraft may also include a second crossboom, the second crossboom connected with the second positioning mechanism at a first end of the second crossboom, the second crossboom connected with the fourth positioning mechanism at a second end of the second crossboom, and the second crossboom connected with the second distal end between the first end and the second end of the second crossboom, wherein the second rigid antenna reflector and the fourth rigid antenna reflector are coupled with the second distal end via the second crossboom.

In some embodiments, the first positioning mechanism may be configured to provide dual-axis rotation.

In some embodiments, in the launch configuration, the first rigid antenna reflector may be forward of the first antenna feed, and in the on-orbit configuration, the first rigid antenna reflector may be aft of the first antenna feed.

In some embodiments, the spacecraft may include a first stiffener strut, wherein a first end of the first stiffener strut may be coupled with the first reflector boom between the first distal end and the first proximal end and a second end of the first stiffener strut may be coupled with the main body at a location other than where the first pivot is connected. The first stiffener strut may be selected from the group consisting of a bi-fold strut, a sliding strut with the first or second end slidably connected with a fixed pivot on the first reflector boom or the main body, respectively, and a fixed strut with the first or second end coupled with a sliding pivot on the first reflector boom or the main body, respectively.

In some embodiments, in the launch configuration, the first distal end extends forward of the forward surface.

In some embodiments, the aft surface includes a launch vehicle mating interface, and the spacecraft is configured to orient the forward surface in the nadir direction in the on-orbit configuration. In some other embodiments, the aft surface comprises a launch vehicle mating interface, and the spacecraft is configured to orient the aft surface in the nadir direction in the on-orbit configuration. In some embodiments, the spacecraft is configured to orient the first pivot and reflector boom west in the on-orbit configuration.

In some embodiments, the first reflector boom includes a first hinge located between the first distal end and the first proximal end. The outboard portion of the first reflector boom may be rotatable about the first hinge rotational axis with respect to the inboard portion of the first reflector boom. In the launch configuration, an outboard portion of the first reflector boom between the first distal end and the first hinge forms an acute angle with respect to an inboard portion of the first reflector boom between the first proximal end and the first hinge. In the on-orbit configuration, the outboard portion of the first reflector boom forms an angle substantially greater than 90° with respect to the inboard portion of the first reflector boom and at least a substantial portion of the outboard portion is forward of the forward surface.

In some embodiments, the spacecraft may further include a third rigid antenna reflector, the third rigid antenna reflector coupled with a third positioning mechanism and associated with a third antenna feed configured to illuminate the third rigid antenna reflector when the spacecraft is in the on-orbit configuration. The spacecraft may also include a third reflector boom with a third proximal end and a third distal end, the third proximal end coupled with the main body via a third pivot and the third distal end coupled with the third rigid antenna reflector via the third positioning mechanism. The spacecraft may further include a fourth rigid antenna reflector, the fourth rigid antenna reflector coupled with a fourth positioning mechanism and associated with a fourth antenna feed configured to illuminate the fourth rigid antenna reflector when the spacecraft is in the on-orbit configuration. The spacecraft may additionally include a fourth reflector boom with a fourth proximal end and a fourth distal end, the fourth proximal end coupled with the main body via a fourth pivot and the fourth distal end coupled with the fourth rigid antenna reflector via the fourth positioning mechanism. The third reflector boom may be configured to rotate about the third pivot and the third positioning mechanism may be configured to rotate the third rigid antenna reflector. The fourth reflector boom may be configured to rotate about the fourth pivot and the fourth positioning mechanism may be configured to rotate the fourth rigid antenna reflector. In the launch configuration, the third reflector boom and the fourth reflector boom are substantially proximate and substantially parallel to the main body, the aperture planes of the third rigid antenna reflector and the fourth rigid antenna reflector are substantially parallel to the spacecraft yaw axis, and a substantial portion of the third rigid antenna reflector and a substantial portion of the fourth rigid antenna reflector are forward of the forward surface and inboard of the main body. In the on-orbit configuration, the aperture planes of the third rigid antenna reflector and the fourth rigid antenna reflector are substantially parallel to the rotational axes of the third pivot and the fourth pivot, respectively, the third reflector boom is at a substantial angle with respect to the main body, the fourth reflector boom is at a substantial angle with respect to the main body, the third rigid antenna reflector is illuminated by the third antenna feed, the fourth rigid antenna reflector is illuminated by the fourth antenna feed, and the third rigid antenna reflector and the fourth rigid antenna reflector are displaced a substantial distance from the main body in the yaw axis direction and in a direction orthogonal to the yaw axis direction.

In some embodiments, the first rigid antenna reflector may be characterized by a focal length, the focal length being no less than an axial length of the main body along the yaw axis. In some embodiments, the first antenna feed may be approximately midway between the forward surface and the aft surface.

In some embodiments, a rigid antenna reflector deployment mechanism is provided which is reconfigurable between a launch configuration and an on-orbit configuration. The deployment mechanism may include a first positioning mechanism configured to be coupled with a first rigid antenna reflector, a reflector boom, the reflector boom including a proximal end and a distal end, the distal end coupled with the first rigid antenna reflector via the first positioning mechanism, and a pivot mechanism with a first portion and a second portion, the first portion configured to pivot relative to the second portion, the first portion coupled with the proximal end, and the second portion configured to attach to a main body of a spacecraft. The deployment mechanism may be configured such that the pivot mechanism rotates the reflector boom about the pivot mechanism rotational axis. In the launch configuration, the aperture plane of the first rigid antenna reflector is substantially normal to the rotational axis of the pivot mechanism, and the rigid antenna reflector deployment mechanism is configured such that a substantial portion of the first rigid antenna reflector is forward of a forward surface of the spacecraft and inboard of the main body. In the on-orbit configuration, the rigid antenna reflector deployment mechanism is configured such that the reflector boom is at a substantial angle with respect to the main body, the first rigid antenna reflector is illuminated by a first antenna feed on the spacecraft, and the first rigid antenna reflector is displaced a substantial distance from the main body in the yaw axis direction and in a direction orthogonal to the yaw axis direction.

In some embodiments of the deployment mechanism, the first positioning mechanism may be a dual-axis positioning mechanism.

In some further embodiments, the deployment mechanism may also include a second positioning mechanism configured to be coupled with a second rigid antenna reflector, the second positioning mechanism connecting the second rigid antenna reflector to the distal end. The deployment mechanism is configured such that the second positioning mechanism rotates the second rigid antenna reflector. In the launch configuration, the aperture plane of the second rigid antenna reflector is substantially normal to the rotational axis of the pivot mechanism, and the rigid antenna reflector deployment mechanism is configured such that a substantial portion of the second rigid antenna reflector is forward of the forward surface and inboard of the main body. In the on-orbit configuration, the rigid antenna reflector deployment mechanism is configured such that the second rigid antenna reflector is illuminated by a second antenna feed on the spacecraft and the second rigid antenna reflector is displaced a substantial distance from the main body in the yaw axis direction and in a direction orthogonal to the yaw axis direction.

In some embodiments, the first positioning mechanism and the second positioning mechanism may be configured, in the launch configuration, to orient the first rigid antenna reflector and the second rigid antenna reflector, respectively, in opposite directions.

In some embodiments, the distal end may include a crossboom substantially orthogonal to the reflector boom. The first positioning mechanism may be coupled with a first end of the crossboom, and the second positioning mechanism may be coupled with the second, opposite end of the crossboom.

In some embodiments, the deployment mechanism may include a stiffener strut. A first end of the stiffener strut may be coupled with the reflector boom between the distal end and the proximal end. A second end of the stiffener strut may be configured to be coupled with the main body at a location other than where the pivot mechanism is configured to be connected.

In some other embodiments, the deployment mechanism reflector boom includes a first hinge located between the distal end and the proximal end. When the rigid antenna reflector deployment mechanism is in the launch configuration, the reflector boom may be configured to be folded about the hinge such that a first portion of the reflector boom between the distal end and the hinge may be drawn against a second portion of the reflector boom between the proximal end and the hinge, and wherein the reflector boom is configured, when the rigid antenna reflector deployment mechanism is in the on-orbit configuration, to be unfolded about the hinge such that the first portion of the reflector boom forms an angle substantially greater than 90° with the second portion.

In some embodiments of the deployment mechanism, the first rigid antenna reflector may be characterized by a focal length. The focal length may be no less than an axial length of the main body along the yaw axis.

In some embodiments, a spacecraft may be reconfigured from a launch configuration to an on-orbit configuration. The spacecraft may include a main body, a forward surface, and an aft surface, the main body located substantially between the forward surface and the aft surface. The reconfiguration may be effected by rotating a first rigid antenna reflector away from the spacecraft yaw axis while the first rigid antenna reflector is positioned forward of a forward surface of the spacecraft, rotating a first reflector boom away from the main body, and rotating the first rigid antenna reflector further away from the spacecraft yaw axis. The spacecraft may be configured such that the first reflector boom has a first proximal end rotatably connected with the main body, the first rigid antenna reflector is connected with a distal end of the first reflector boom, the first reflector boom is rotated about an axis at the proximate end, and the first rigid antenna reflector rotates with the first rigid antenna reflector boom.

DETAILED DESCRIPTION

Figure 1A:
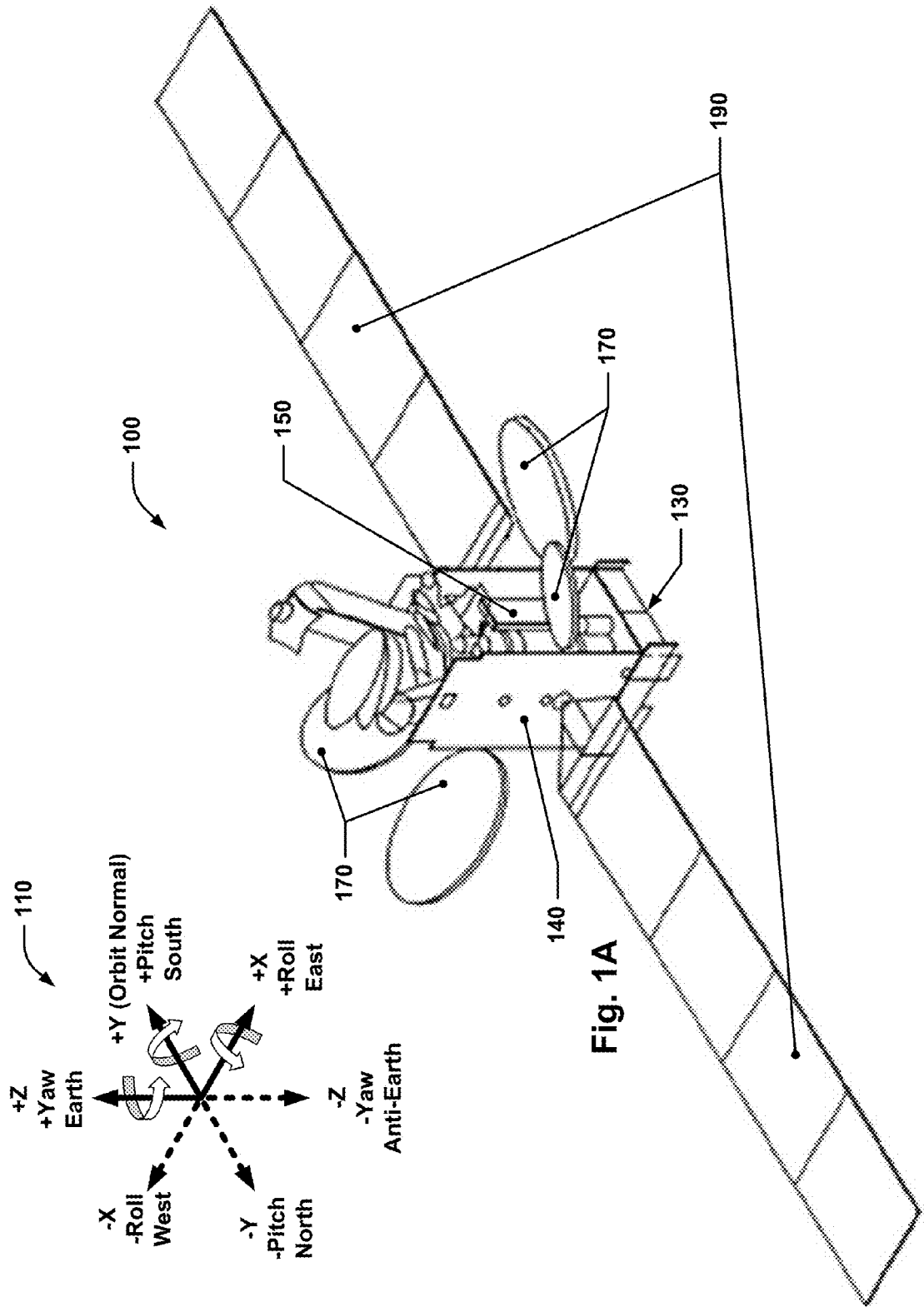
FIG. 1A depicts an isometric view of a generic satellite showing major components as well as a reference coordinate system.

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to or with another element, it can be directly connected or coupled to or with the other element, or intervening elements may be present. Furthermore, "connected" or "coupled" as used herein in an electrical context may include wirelessly connected or coupled. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

The phrase "substantially parallel" as used herein, unless otherwise expressly indicated, refers to a relationship in which one generally linear or flat part is either parallel to, or at a small acute angle to, another generally linear or flat part. For example, in some embodiments, a deployed antenna reflector attached to the distal end of a reflector boom may have an aperture plane which is substantially parallel to the axis of rotation for the reflector boom—the deployed antenna reflector, however, may be rotationally offset from an ideal "parallel" configuration to allow the antenna reflector to be illuminated by an antenna feed and to aim the boresight at a target. As used herein, substantially parallel parts may be, for example, at as much as approximately a 10° or 30° angle with respect to each other and still be considered to be substantially parallel. In some instances, a part may be described as being substantially parallel to a much larger part, in which case the relationship is to be understood as being between the part and a surface of the larger part which is proximate to the part, e.g., the reflector boom may be substantially parallel to the main body if the reflector boom is substantially parallel to the surface of the main body to which it is closest.

The phrase "substantially normal" as used herein, unless otherwise expressly indicated, refers to a relationship in which a plane or generally flat part or surface is either normal to, or at a minimum angle close to 90° with respect to, a reference axis. A plane which is substantially normal to an axis may be, for example, at as much as approximately a (60° or 80° minimum angle with respect to the axis and still be considered to be substantially normal.

The term "aperture plane" refers to a reference plane for an antenna reflector which is generally defined by the antenna reflector edge, e.g., the outer perimeter of the antenna reflector. Some antenna reflectors may actually include multiple reflector surfaces within the reflector, e.g., in a layered fashion, each with their own reflector edge, although the singular "aperture plane" is used herein to refer to single- and multiple-reflector surface reflectors.

The term "main body" as used herein, unless otherwise expressly indicated, refers to the nominal major structure of the spacecraft. The main body typically contains the internal payload and bus equipment of the spacecraft and provides structural mounting locations for various external elements, such as solar panels, antenna reflectors, thermal management elements, antenna feeds, delivery vehicle mating interfaces, modules, etc.

The term "aft surface" as used herein, unless otherwise expressly indicated, refers to the major surface of a spacecraft main body which is aftmost when the spacecraft is in the launch configuration on a delivery vehicle. Aft is defined as being opposite the direction of travel of the delivery vehicle. There may be other surfaces which are further aft of the aft surface, such as surfaces on a launch vehicle mating interface, but these are typically much smaller surfaces. The aft surface may be substantially planar, or may be contoured or possess other minor features.

The term "forward surface" as used herein, unless otherwise expressly indicated, refers to the major surface of a spacecraft main body which is foremost when the spacecraft is in the launch configuration on the delivery vehicle. Forward, in this context, is defined as being in the direction of travel of the delivery vehicle. It is to be understood that the term "forward surface" does not refer to structures which are movable with respect to the main body, e.g., repositionable reflectors. It is to be further understood that the term forward surface also does not refer to minor surfaces on structures or modules which extend from the forward surface. For example, in some embodiments, a module may extend from the forward surface. The module may possess a substantially smaller cross-sectional area than the forward surface area, i.e., a minor surface. As used herein, the top of such a module should not be construed to constitute the "forward surface."

The terms "outboard" and "inboard" as used herein, unless otherwise indicated, refer to relationships between one element/portion and another element/portion based on their distances from the yaw axis of a satellite. For example, if most of component A is located a further perpendicular distance from the yaw axis than most of component B, component A may be said to be "outboard" of component B. Similarly, component B may be said to be "inboard" of component A. There may be some portions of component A which are closer to the yaw axis than some portions of component B, but it will be understood that component A may nonetheless still be substantially outboard of component B.

Figure 1B:
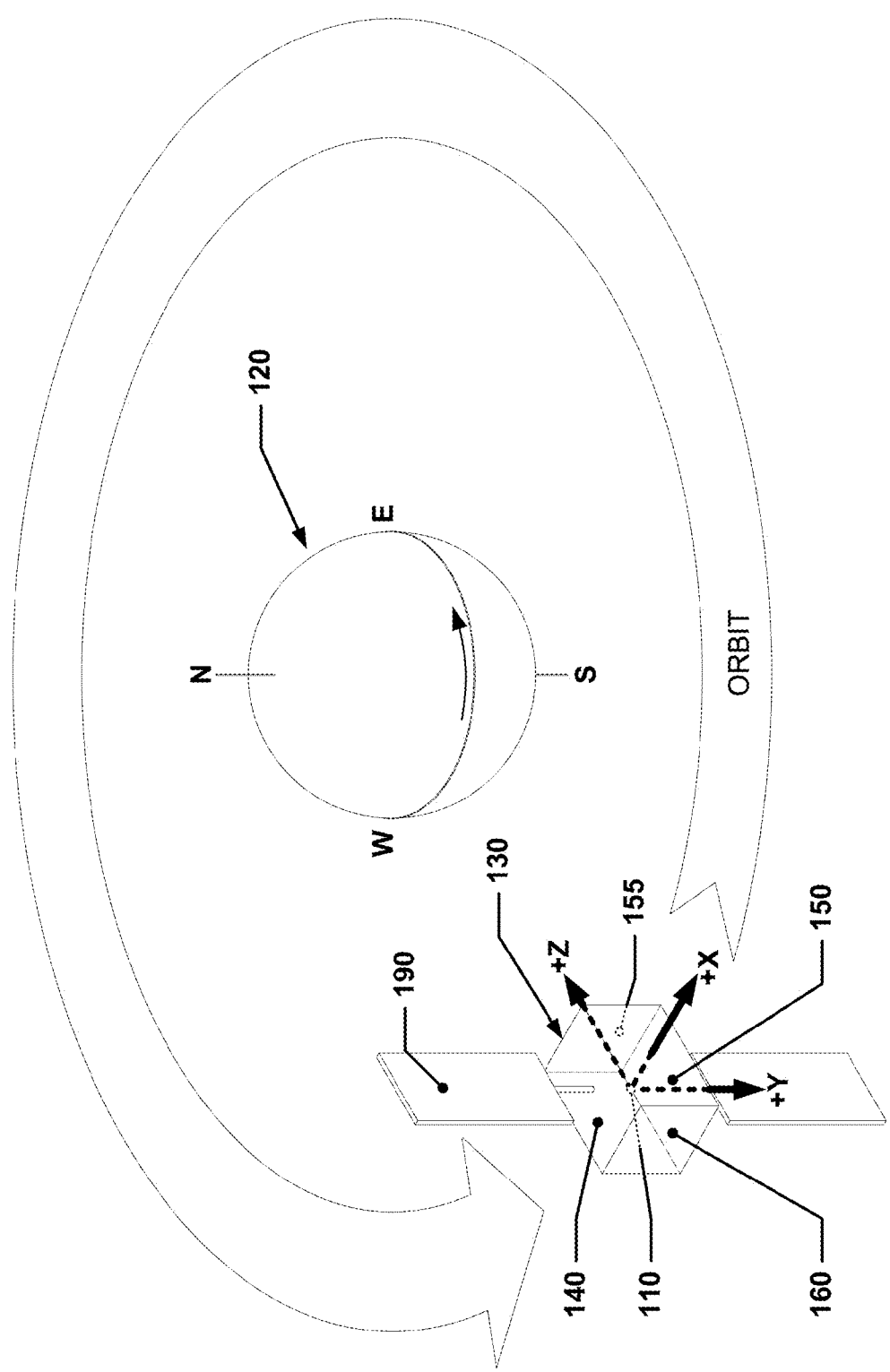
FIG. 1B depicts a simplified diagram showing a generic satellite in orbit about a planet.
Figure 1C:
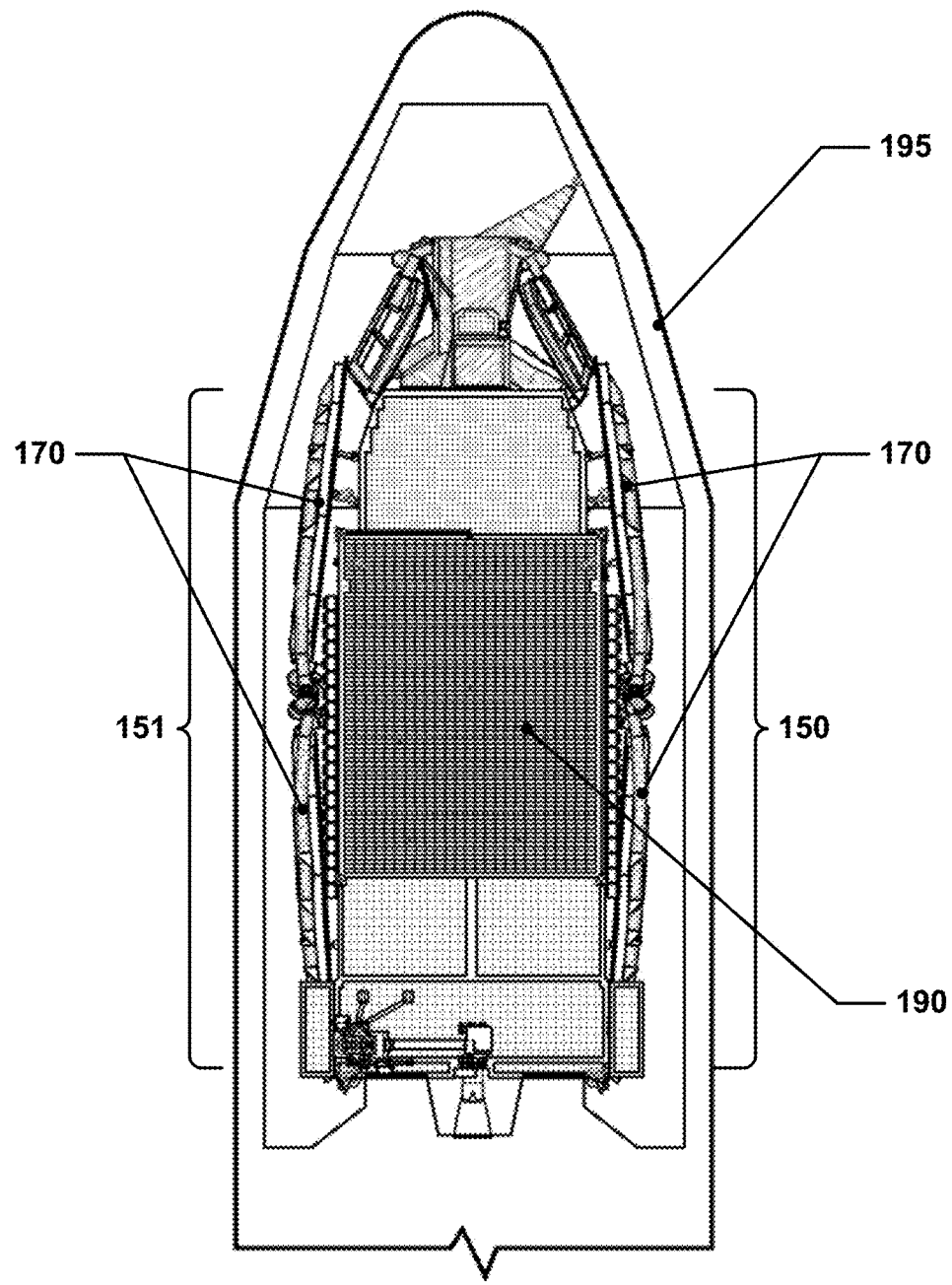
FIG. 1C depicts an elevation view of a generic satellite mounted to a launch vehicle.

FIGS. 1A-1C depict various generic prior-art spacecraft for discussion purposes. Spacecraft, which may also be referred to herein as satellites, typically possess a main body with North (N), South (S), East (E), and West (W) panels which are disposed between and orthogonal to an aft panel and a forward panel of the main body. Each panel is labeled according to the general direction toward which its normal vector is oriented when the satellite is on-orbit. The panels of the N, S, E, and W panels may, generically, also be referred to as side panels, sides, or surfaces. The aft and forward panels may, generically, also be referred to as aft and forward surfaces, respectively. For example, an on-orbit satellite is generally oriented such that normal vectors drawn from the N panel and the S panel are in substantial alignment with the N-S axis of the Earth, with the N panel facing North and the S panel facing South, and such that the normal vectors drawn from the E panel and the W panel are in substantial alignment with the E-W direction.

Satellites may include one or more antenna systems designed to communicate with distant targets, such as locations on Earth. An antenna system may include, for example, an antenna reflector illuminated by a radio-frequency feed (RF feed). Such an antenna reflector may, for example, be an on-axis or off-axis parabolic reflector dish.

Antenna reflectors may be either furlable or rigid structures. Furlable antenna reflectors are typically, when unfurled, substantially larger in diameter than the launch vehicle fairing, and are therefore required to be "furled" into a much smaller launch configuration volume.

By way of contrast, rigid antenna reflectors are not designed to unfurl, and cannot be placed into a stowed configuration which is much smaller in volume compared to the operational configuration. Instead, they are constructed to maintain their overall shape during stowage, launch, deployment, and on-orbit use. A rigid antenna reflector may be capable of flexing and otherwise deforming in minor ways, however the overall shape of a rigid antenna reflector will stay the same. Rigid antenna reflectors are often mounted to mechanisms which are attached to a side panel of a spacecraft and which fold the antenna reflector against the side panel in the launch configuration such that the antenna reflector aperture plane is substantially parallel to the side panel and such that at least a substantial portion of the antenna reflector is aft of the forward panel. Spacecraft 100 shown in FIG. 1A includes two side-mounted antenna reflectors on the E side which fold against the E side and two side mounted antenna reflectors on the W side which fold against the W side. FIG. 1C shows a similar spacecraft in a launch configuration with the antenna reflectors in the stowed positions on the E and W sides.

A better understanding of the reference frames used to describe satellites may be obtained by referring to FIGS. 1A and 1B, wherein an Earth-pointing three axis stabilized satellite 100 is illustrated with respect to a reference spacecraft body coordinate frame 110 having roll (x), pitch (y), and yaw (z) axes. Conventionally, the yaw axis is defined as being directed along a line intersecting Earth 120 center of mass and spacecraft 100 center of mass; the roll axis is defined as being perpendicular to the yaw axis, lying in the plane of the orbit in the direction of the spacecraft velocity vector; and the pitch axis (y), normal to the orbit plane, completes a three-axis, right-hand orthogonal system. Satellite 100 has a main body 130 substantially in the form of a rectangular cuboid. A first panel surface 140, orthogonal to the y-axis, faces generally north when the satellite is in an on-orbit configuration, and may be referred to hereinafter as the north panel. A second panel surface 150, orthogonal to the x-axis, may be referred to hereinafter as the east panel. A third panel surface and a fourth panel surface (not shown), disposed opposite, respectively, to north panel 120 and east panel 140, will be referred to hereinafter, respectively, as the south panel and the west panel. In some embodiments, the satellite may have curved sides or otherwise depart from a true rectangular cuboid. In such embodiments, terms east, west, north, and south may still be used to refer to portions of the satellite which generally face in those directions when the satellite is on-orbit.

Satellite 100 may also include Earth deck 155 and anti-Earth deck 160. Conventionally, Earth deck 155 is orthogonal to the z axis and facing earthwards (or towards whatever body the satellite orbits); anti-Earth deck 160 is also orthogonal to the z axis, but facing away from the Earth. Earth deck 155 or anti-Earth deck 160 may have additional separately attached or integrated structures which extend away from either deck. In some embodiments, Earth deck 155 may correspond with the forward surface, and anti-Earth deck 160 may correspond with the aft surface. In some other embodiments, which may be referred to as "inverted" satellite configurations, Earth deck 155 may correspond with the aft surface, and anti-Earth deck 160 may correspond with the forward surface.

Referring now to FIG. 1C, a launch configuration of satellite 100 is illustrated in elevation view, together with a typical launch vehicle fairing envelope 195. It may be observed that, in the launch configuration, solar arrays 190 are disposed proximate to north panel 140 and the south panel (not shown) and that antenna reflectors 170 are disposed proximate to east panel 150 and west panel 151.

In one embodiment, an antenna reflector packaging solution is provided that allows for the use of a rigid antenna reflector featuring a large focal length while respecting conventional launch vehicle envelope constraints. Such an antenna reflector may be implemented by connecting the antenna reflector with a rotating reflector boom which may be used to deploy the antenna reflector outboard of the spacecraft body. One such implementation is depicted in FIGS. 2A-D, which are discussed in further detail below. In a stowed position, i.e., in a launch configuration, antenna reflectors 220-223 may be stored forward of forward surface 250 of spacecraft 200 and with the aperture planes of antenna reflectors 220-223 substantially parallel to the spacecraft yaw axis. In the deployed, i.e., on-orbit, configuration, reflector booms 215 and 216 may be rotated to place antenna reflectors 220-223 outboard of the spacecraft main body and to place the aperture planes of antenna reflectors 220-223 substantially parallel to, or at a slight angle to, the axes of rotation of reflector booms 215 and 216.

Figure 2A:
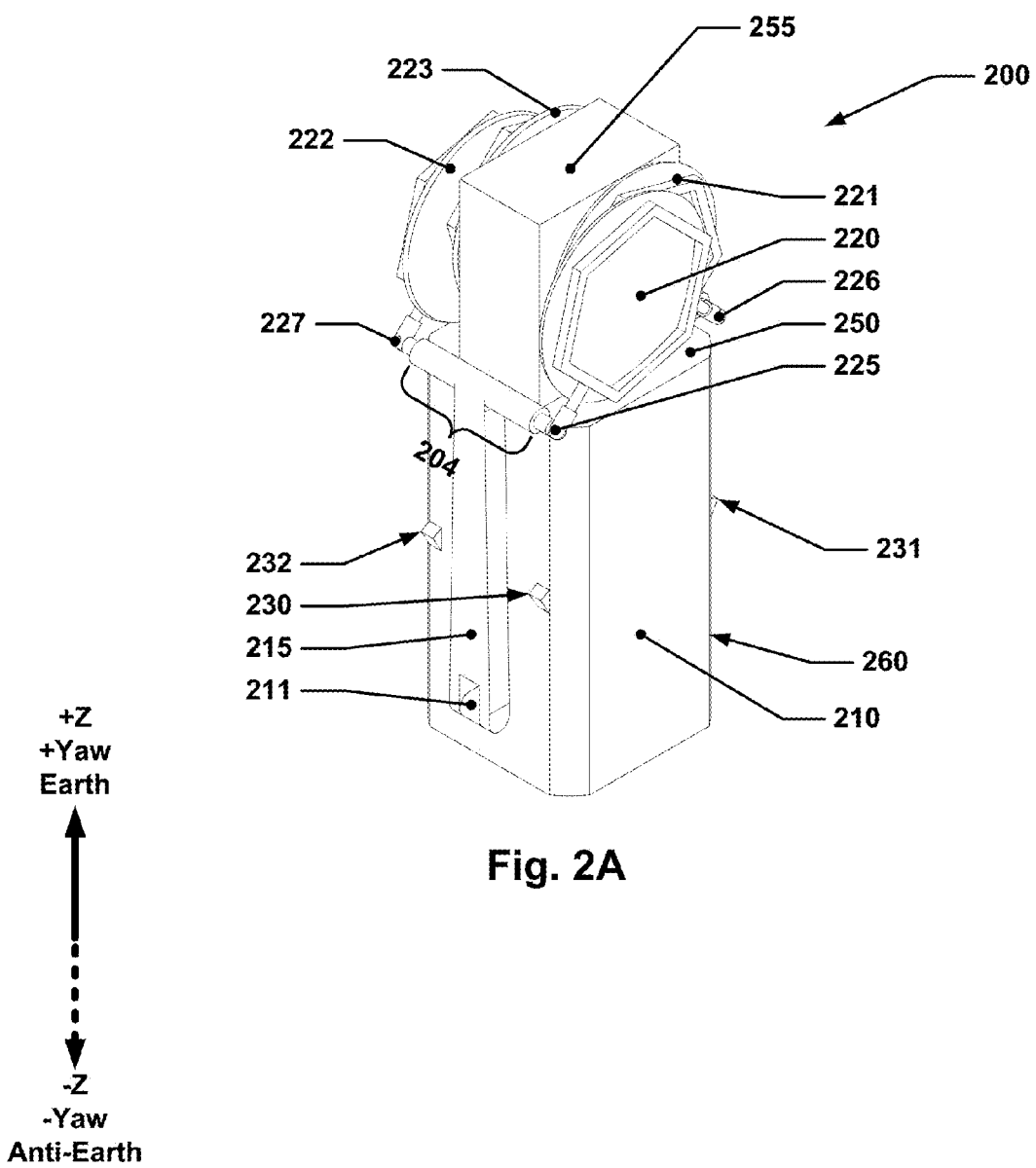
FIG. 2A depicts one conceptual satellite embodiment in a launch configuration.

FIG. 2A depicts a conceptual view of one such embodiment; as such, some major spacecraft components which would typically be shown, such as solar panels, have been omitted. Satellite 200 may include main body 210, which is disposed between the aft surface (not shown) of satellite 200 and forward surface 250. Module 255 may protrude from forward surface 250 and be used to house some interior payload components.

Figure 2B:
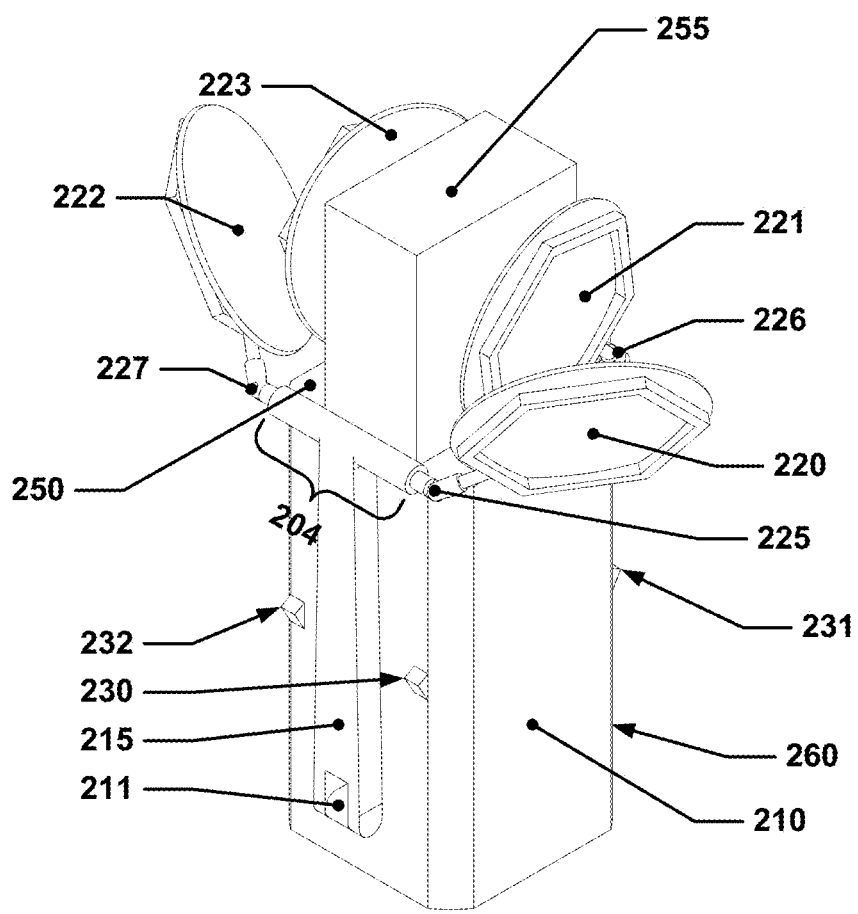
FIG. 2B depicts the satellite embodiment of FIG. 2A during transition from the launch configuration to an on-orbit configuration.
Figure 2B:
Figure 2C:
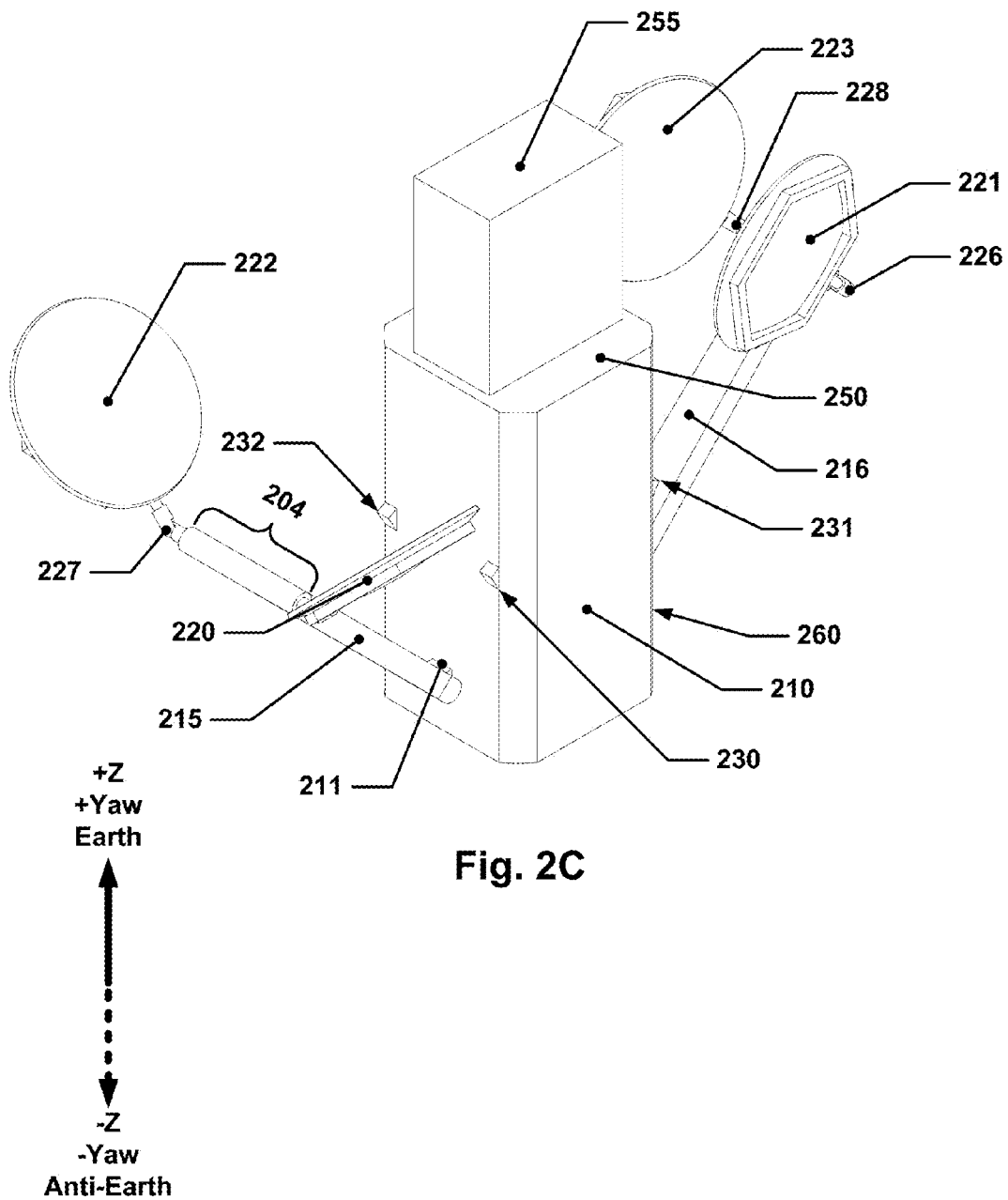
FIG. 2C depicts the satellite embodiment of FIG. 2A during transition from the launch configuration to the on-orbit configuration.
Figure 2D:
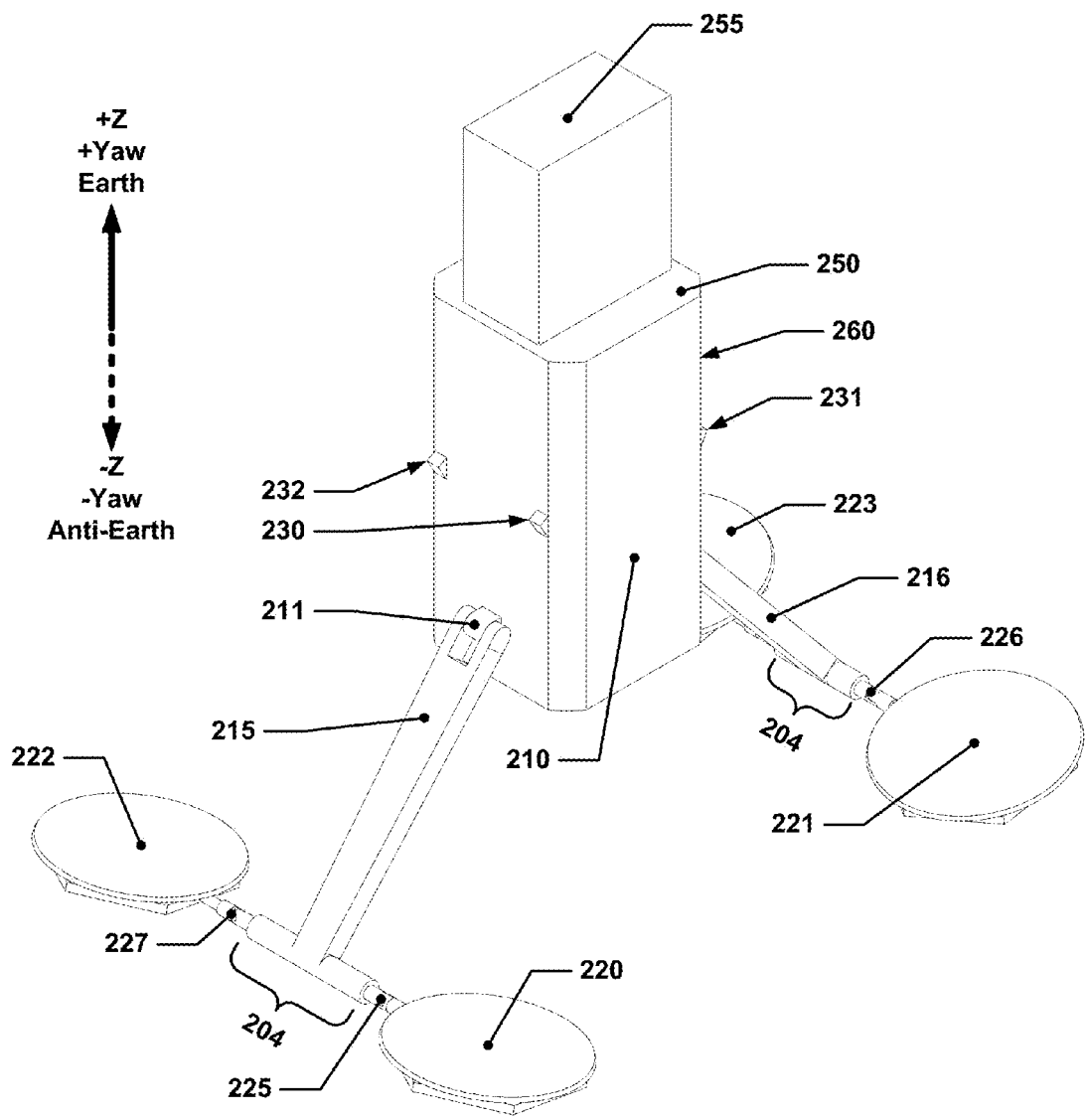
FIG. 2D depicts the satellite embodiment of FIG. 2A in the on-orbit configuration.

Satellite 200 may be reconfigurable between a launch configuration and an on-orbit configuration. An example launch configuration is shown in FIG. 2A. An example on-orbit configuration is shown in FIG. 2D. FIGS. 2B and 2C depict satellite 200 in various intermediate stages of transitioning between the launch configuration and the on-orbit configuration.

Satellite 200 may also include first antenna reflector 220, which may be connected with first positioning mechanism 225. First antenna reflector 220 may be coupled with first reflector boom 215 by first positioning mechanism 225. First positioning mechanism 225 may be a dual-axis positioning mechanism (DAPM) capable of rotating first antenna reflector 220 about two different axes. First reflector boom 215 may be coupled with main body 210 via first pivot 211. For discussion purposes, the end of a reflector boom which is coupled with main body 210 may be referred to as the proximal end, and the end of a reflector boom which is coupled with a positioning mechanism may be referred to as the distal end.

In general, the on-orbit configurations of the antenna reflectors are driven by the antenna feed locations and the antenna pointing requirements. In some embodiments, a three-axis positioning mechanism (TAPM) may be used. In some alternative embodiments, a DAPM may be used in combination with a third axis of rotation supplied elsewhere in the spacecraft, such as via a skew in the boom pivot axis. For example, while some embodiments may have a first pivot rotational axis which is oriented generally perpendicular to planes defined by the pitch, roll, or yaw axes of the spacecraft, other embodiments may have a first pivot rotational axis which is at an angle or a compound angle to planes defined by the pitch, roll, or yaw axes of the spacecraft.

Satellite 200 may also include second antenna reflector 221, which may be connected with second positioning mechanism 226. Second antenna reflector 221 may be coupled with the distal end of second reflector boom 216 (see FIGS. 2C and 2D) by second positioning mechanism 226. Second positioning mechanism 226 may be a DAPM capable of rotating second antenna reflector 221 about two different axes. The proximal end of second reflector boom 216 may be coupled with main body 210 via a second pivot (not shown). Second reflector boom 216 may be mounted to the side of satellite 200 opposite the side of satellite 200 to which first reflector boom 215 is mounted. For example, first reflector boom 215 may be mounted to a second or E panel/side of satellite 200, and second reflector boom 216 may be mounted to a fourth or W panel/side of satellite 200.

Satellite 200 may additionally include third antenna reflector 222, which may be connected with third positioning mechanism 227. Third antenna reflector 222 may be coupled with the distal end of first reflector boom 215 by third positioning mechanism 227. Third positioning mechanism 227 may be a DAPM capable of rotating third antenna reflector 222 about two different axes.

Satellite 200 may further include fourth antenna reflector 223, which may be connected with fourth positioning mechanism 228 (see FIG. 2C). Fourth antenna reflector 223 may be coupled with the distal end of second reflector boom 216 by fourth positioning mechanism 228. Second positioning mechanism 228 may be a DAPM capable of rotating fourth antenna reflector 223 about two different axes.

First antenna reflector 220, second antenna reflector 221, third antenna reflector 222, and/or fourth antenna reflector 223 may each be characterized by a focal length, the focal lengths being no less than the axial length of the main body along the yaw axis, i.e., no less than the minimum distance separating the forward and the aft surfaces. In some embodiments, the focal length may be more than 1.5 times the axial length of the main body along the yaw axis.

Satellite 200 may also include first antenna feed 230, second antenna feed 231, third antenna feed 232, and a fourth antenna feed (not shown); each antenna feed may be associated with a similarly indexed antenna reflector. It is to be understood that each antenna feed may, in practice, comprise several separate antenna feeds which are all intended to be used with the same common antenna reflector. It is to be understood that the use of the singular "antenna feed" in association with an antenna reflector herein is intended to embrace multi-feed systems in addition to single-feed systems.

The antenna feeds for satellite 200 may be located approximately midway between forward surface 250 and the aft surface. Such placement allows for the average length of the waveguides for the antenna feeds to be minimized, which may reduce the average line losses associated with the feeds. For example, first antenna feed 230, second antenna feed 231, third antenna feed 232, and/or the fourth antenna feed (not shown) may be located approximately midway along the main body in the yaw axis direction.

While the embodiment depicted features four antenna reflectors and two reflector booms, it is to be recognized that configurations with more or fewer of these components fall within the scope of this disclosure. For example, some embodiments may include four antenna reflectors and four reflector booms. Some other embodiments may include one or more reflector booms with a single antenna reflector or with multiple antenna reflectors.

In the launch configuration, first reflector boom 215 may be drawn against main body 210, e.g., first reflector boom 215 may be substantially proximate and substantially parallel to main body 210. First reflector boom 215 may be held in place in the launch configuration by a holddown or other releasable mechanism (not shown) to assist in managing dynamic launch loads. Second reflector boom 216 may be drawn against main body 210 in a similar manner. First antenna reflector 220 may be oriented such that the antenna reflector aperture plane for first antenna reflector 220 is substantially parallel to the yaw axis of the spacecraft and that a substantial portion of antenna reflector 220 is forward of forward surface 250. For example, in some embodiments, the antenna reflectors may partially nestle in a recess in the forward surface—in such embodiments, a substantial portion of an antenna reflector is still forward of the forward surface. Second antenna reflector 221, third antenna reflector 222, and fourth antenna reflector 223 may also be oriented such that their antenna reflector aperture planes are substantially parallel to the spacecraft yaw axis and such that substantial portions of second antenna reflector 221, third antenna reflector 222, and fourth antenna reflector 223 are forward of forward surface 250. First antenna reflector 220 may also be oriented such that the aperture plane of first antenna reflector 220 is substantially normal to the rotational axis for first pivot 211. Second antenna reflector 221 may be similarly configured, although with respect to the rotational axis of the second pivot. Third antenna reflector 222 and fourth antenna reflector 223 may also be similarly configured, although with respect to the appropriate pivot. Advantageously, a substantial portion of each antenna reflector may be disposed "inboard" of the main body, by which is meant, here, and in the claims, that the substantial portion of the antenna reflector is closer to the yaw axis than an element of the main body that is furthest from the yaw axis.

In embodiments similar to the embodiment shown in FIG. 1A, first antenna reflector 220 and third antenna reflector 222 may both be substantially outboard of second antenna reflector 221 and fourth antenna reflector 223. In some other embodiments, first antenna reflector 220 may be outboard of second antenna reflector 221, and third antenna reflector 222 may be inboard of fourth antenna reflector 223. Other similar permutations of antenna reflector positional order in the launch configuration may also be used.

In the on-orbit configuration, first reflector boom 215 may be at a substantial angle with respect to the main body. For example, the angle included between first reflector boom 215 and the main body in the on-orbit configuration may be an obtuse angle or, in some configurations, an obtuse angle greater than 120°. In some on-orbit configurations, the angle included between first reflector boom 215 and the main body in the on-orbit configuration may be sufficient to cause first antenna reflector 220 to be aft of the aft surface. The antenna reflector aperture plane of first antenna reflector 220 may be oriented to be substantially parallel to the rotational axis of first pivot 211. First antenna reflector 220, second antenna reflector 221, third antenna reflector 222, and fourth antenna reflector 223 are illuminated by first antenna feed 230, second antenna feed 231, third antenna feed 232, and the fourth antenna feed, respectively. Similarly, the boresights for first antenna reflector 220, second antenna reflector 221, third antenna reflector 222, and fourth antenna reflector 223 may be oriented in a first desired beam direction, a second desired beam direction, a third desired beam direction, and a fourth desired beam direction, respectively.

To transition satellite 200 between the launch configuration and the on-orbit configuration, first antenna reflector 220, second antenna reflector 221, third antenna reflector 222, and fourth antenna reflector 223 may be rotated away from the centerline of satellite 200, i.e., outboard, using first positioning mechanism 225, second positioning mechanism 226, third positioning mechanism 227, and fourth positioning mechanism 228, respectively. Such rotation may be necessary to clear equipment which may interfere with the antenna reflectors when first reflector boom 215 is rotated about first pivot 211 or second antenna reflector boom 216 is rotated about the second pivot. For example, an antenna reflector may be partially nestled inside another antenna reflector in the launch configuration; the cupping antenna reflector may therefore need to be rotated outboard by its positioning mechanism before the reflector boom connected with the nestled antenna reflector may be rotated outboard. Such rotation may be unnecessary if such interference will not occur. First reflector boom 215 may be rotated about first pivot 211 and into the on-orbit position, and second reflector boom 216 may be rotated about the second pivot into the on-orbit position. First antenna reflector 220 and third antenna reflector 222 may be further rotated by first positioning mechanism 225 and third positioning mechanism 227, respectively, such that the antenna reflector aperture planes of first antenna reflector 220 and third antenna reflector 222 are substantially parallel to the rotational axis of first pivot 211, illuminated by first antenna feed 230 and third antenna feed 232, respectively, and oriented in a first desired beam direction and a third desired beam direction, respectively. Second antenna reflector 221 and fourth antenna reflector 223 may be further rotated by second positioning mechanism 226 and fourth positioning mechanism 228, respectively, such that the antenna reflector aperture planes of second antenna reflector 221 and fourth antenna reflector 223 are substantially parallel to the rotational axis of the second pivot, illuminated by second antenna feed 231 and the fourth antenna feed (not shown), respectively, and oriented in a second desired beam direction and a fourth desired beam direction, respectively. FIGS. 2A-2D illustrate satellite 200 transitioning from a launch configuration (FIG. 2A) to an on-orbit configuration (2D); FIGS. 2B and 2C illustrate potential intermediate phases of the transition.

In some embodiments, some of the rotational steps described above may be combined. For example, the antenna reflectors may initially be rotated such that no or little further rotation is required once the reflector booms are rotated into the on-orbit position. In embodiments where some of the above-described components are missing, corresponding steps need not be performed.

Some embodiments may include additional features. For example, some embodiments may feature a crossboom which is mounted to the distal end of a reflector boom. The crossboom may be substantially orthogonal to the major axis of the reflector boom, and may have a positioning mechanism and antenna reflector mounted to each end. The cross boom may be used to space the connected antenna reflectors apart in a direction corresponding with the reflector boom pivot axis. Such a configuration may be used to provide a gap between the antenna reflectors when in the launch configuration which may be occupied by, for example, module 255, other antenna reflectors, or other equipment. The cross booms may vary in length between reflector booms or be axially offset with respect to each other.

Some embodiments may also include holddowns configured to releasably secure the antenna reflector(s) used. Some holddowns may secure two or more reflectors.

Some embodiments may include a reflector boom with a stiffener strut. The stiffener strut may be used to provide additional rigidity to the reflector boom when the reflector boom is in the on-orbit configuration, and may also serve to limit the rotational travel of the reflector boom about the reflector boom pivot. The stiffener strut may be connected with the reflector boom at one end and to the main body at the other end. The stiffener strut may be a bi-fold strut, a sliding strut with the first or second end slidably connected with a fixed pivot on the reflector boom or the main body, respectively, and a fixed strut with the first or second end connected with a sliding pivot on the first reflector boom or the main body, respectively. The stiffener strut may also be used to assist in deploying the reflector boom into the on-orbit position. For example, the stiffener strut may be spring-biased such that it forces the reflector boom into the on-orbit configuration.

As mentioned, the reflector boom may be driven into the on-orbit position through a biasing mechanism on a stiffener strut. In some embodiments, however, the reflector boom may be driven into the on-orbit position by a spring drive associated with the reflector boom pivot or by a motorized actuator. The satellite may also feature a hard stop which limits the rotational travel of the reflector boom about the reflector boom pivot.

In some configurations, the position of the reflector boom pivot and the length of the reflector boom may be selected such that the distal end and the positioning mechanism(s) coupled with the distal end are located between the forward surface and the approximate centers of the antenna reflectors in the launch configuration. In some other configurations, the position of the reflector boom pivot and the length of the reflector boom may be selected such that the distal end and the positioning mechanism(s) coupled with the distal end are located forward of the approximate centers of the antenna reflectors in the launch position.

Various positioning mechanisms may be used. As mentioned, in some embodiments, the positioning mechanism used may be a DAPM. Such mechanisms may be capable of large gross movement in addition to precision motion control. For example, a DAPM may be used which is capable of large-angle rotation throughout a portion of its range of travel in order to deploy antenna reflectors from their stowed positions, and which may also perform small-angle rotation through a smaller portion of its range of travel in order to provide for antenna reflector beam steering.

In general, the on-orbit configurations of the antenna reflectors are driven by the antenna feed locations and the antenna pointing requirements. In some embodiments, a three-axis positioning mechanism (TAPM) may be used. In some alternative embodiments, a DAPM may be used in combination with a third axis of rotation supplied elsewhere in the spacecraft, such as via a skew in the boom pivot axis. For example, while some embodiments may have a first pivot rotational axis which is oriented generally perpendicular to planes defined by the pitch, roll, or yaw axes of the spacecraft, other embodiments may have a first pivot rotational axis which is at an angle or a compound angle to planes defined by the pitch, roll, or yaw axes of the spacecraft.

FIGS. 2A-2D depict an embodiment in which the aft surface of the satellite faces in the zenith (anti-Earth) direction and forward surface 250 of the satellite faces in the nadir (Earth) direction when the satellite is on-orbit. Other embodiments may be used to support an "inverted" configuration wherein the aft surface of the satellite faces in the nadir direction and the forward surface of the satellite faces in the zenith direction.

Figures 3A, 3B:
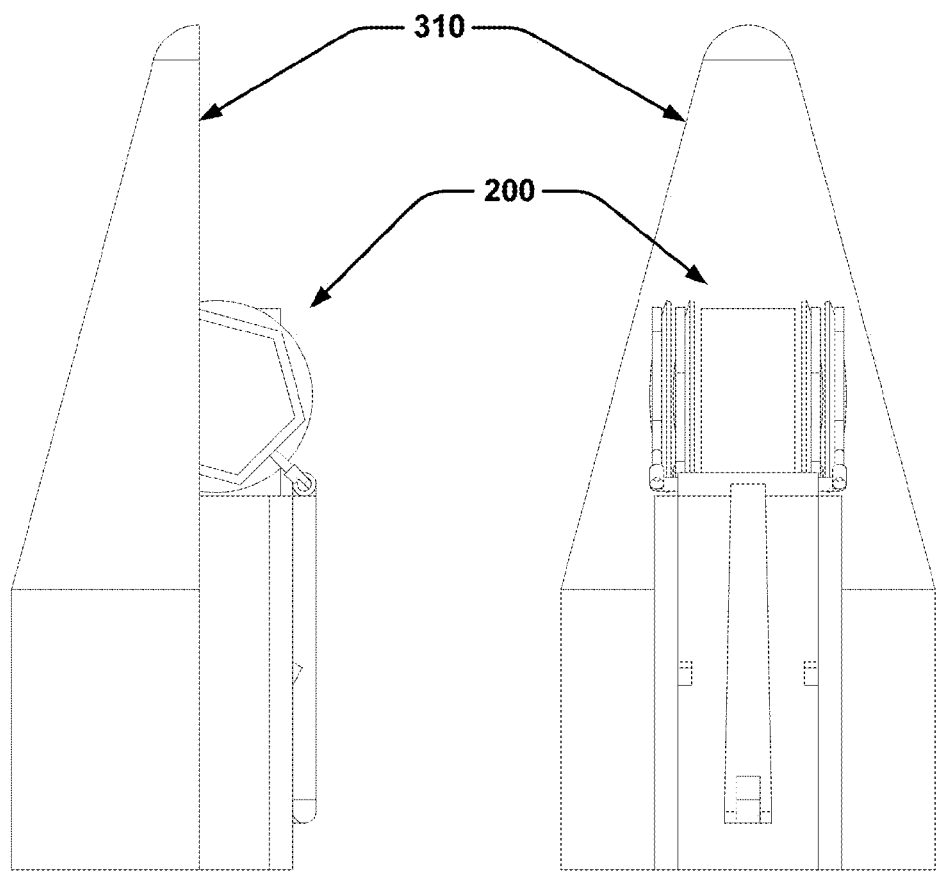
FIG. 3A depicts a side view of the satellite embodiment of FIG. 2A within a partially-sectioned launch vehicle fairing envelope.
FIG. 3B depicts a second side view of the satellite embodiment of FIG. 3A within a launch vehicle fairing envelope.
Figure 4A:
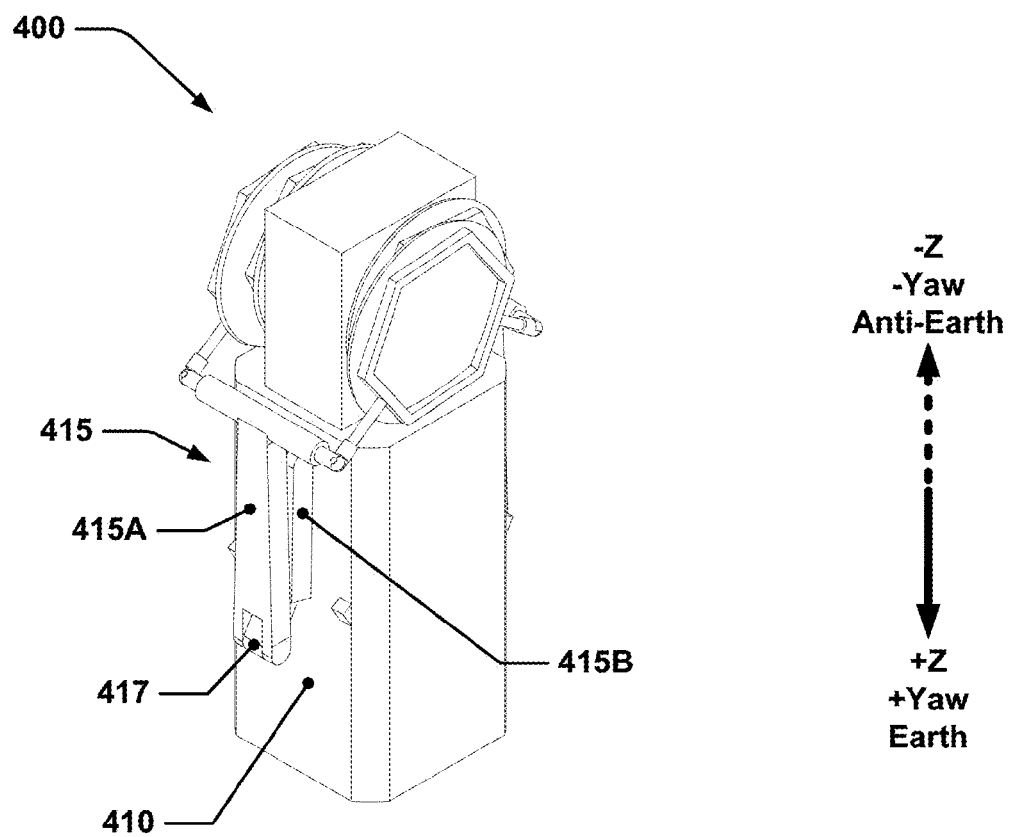
FIG. 4A depicts a second conceptual satellite embodiment in a launch configuration.
Figure 4B:
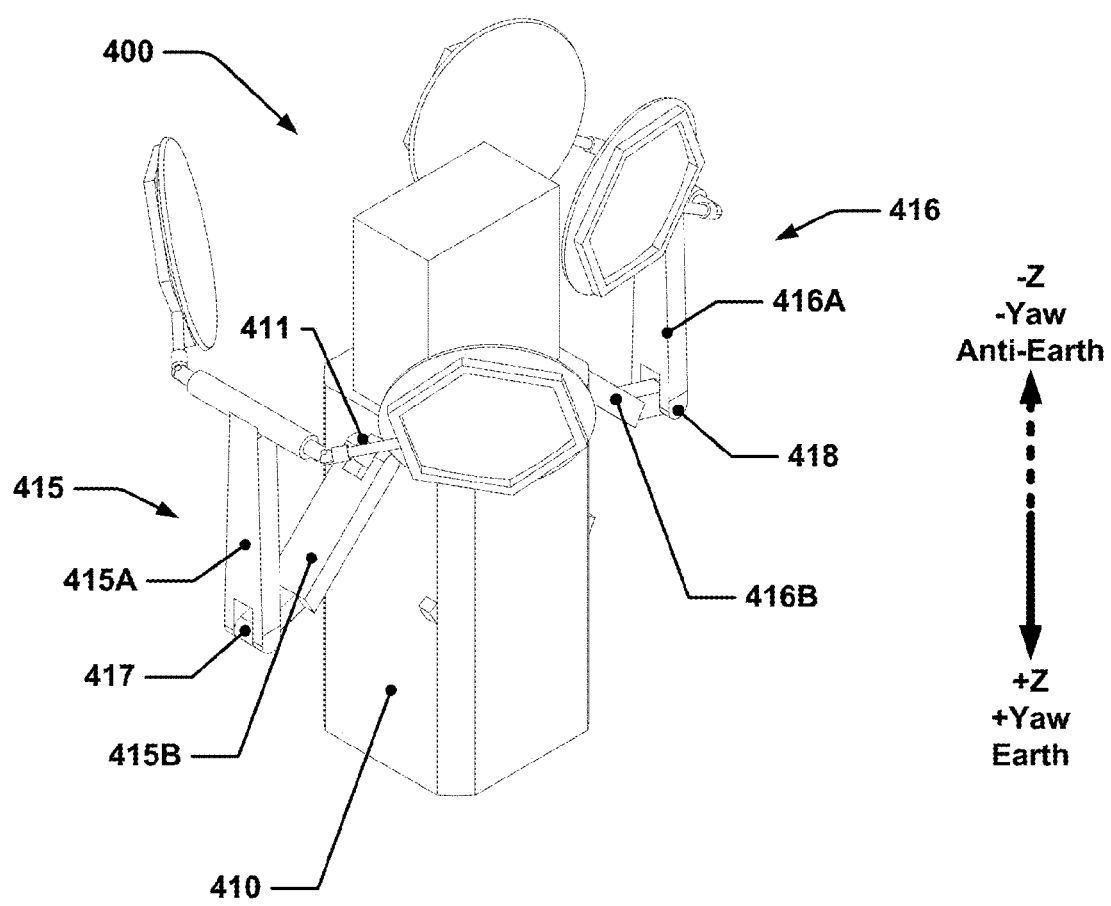
FIG. 4B depicts the satellite embodiment of FIG. 4A during transition from the launch configuration to an on-orbit configuration.
Figure 4C:
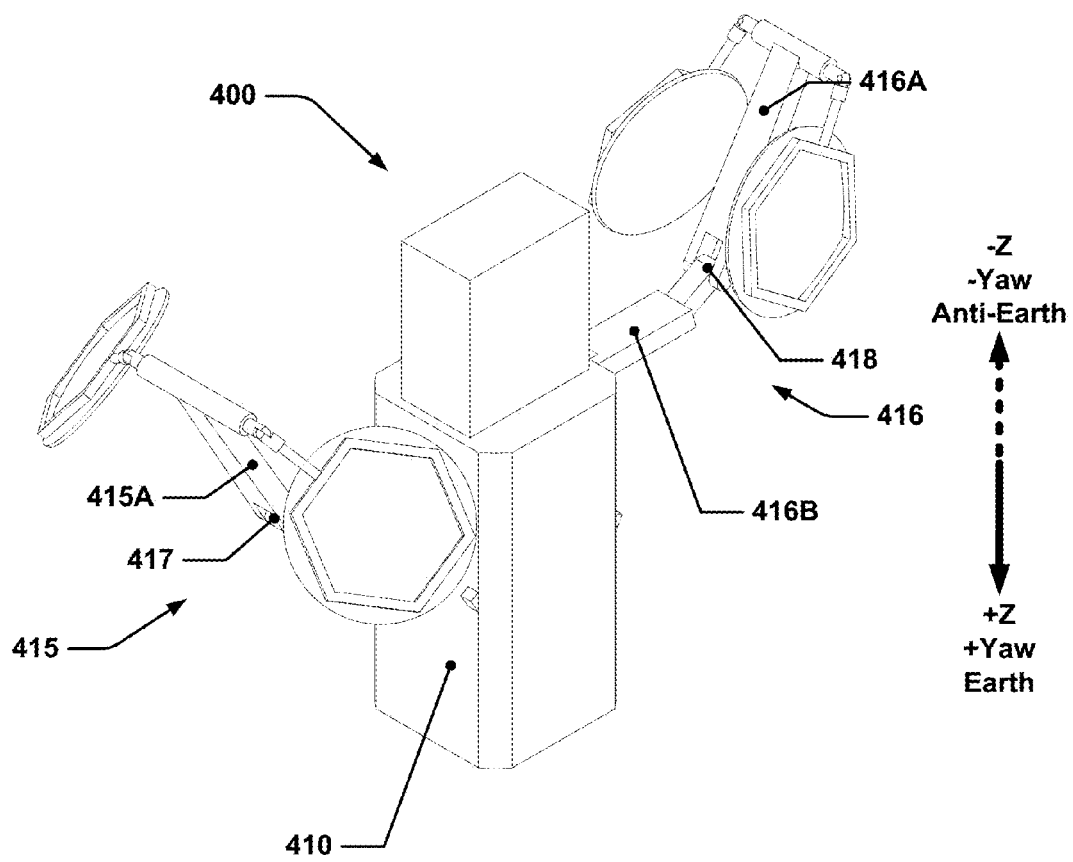
FIG. 4C depicts the satellite embodiment of FIG. 4A during transition from the launch configuration to the on-orbit configuration.
Figure 4D:
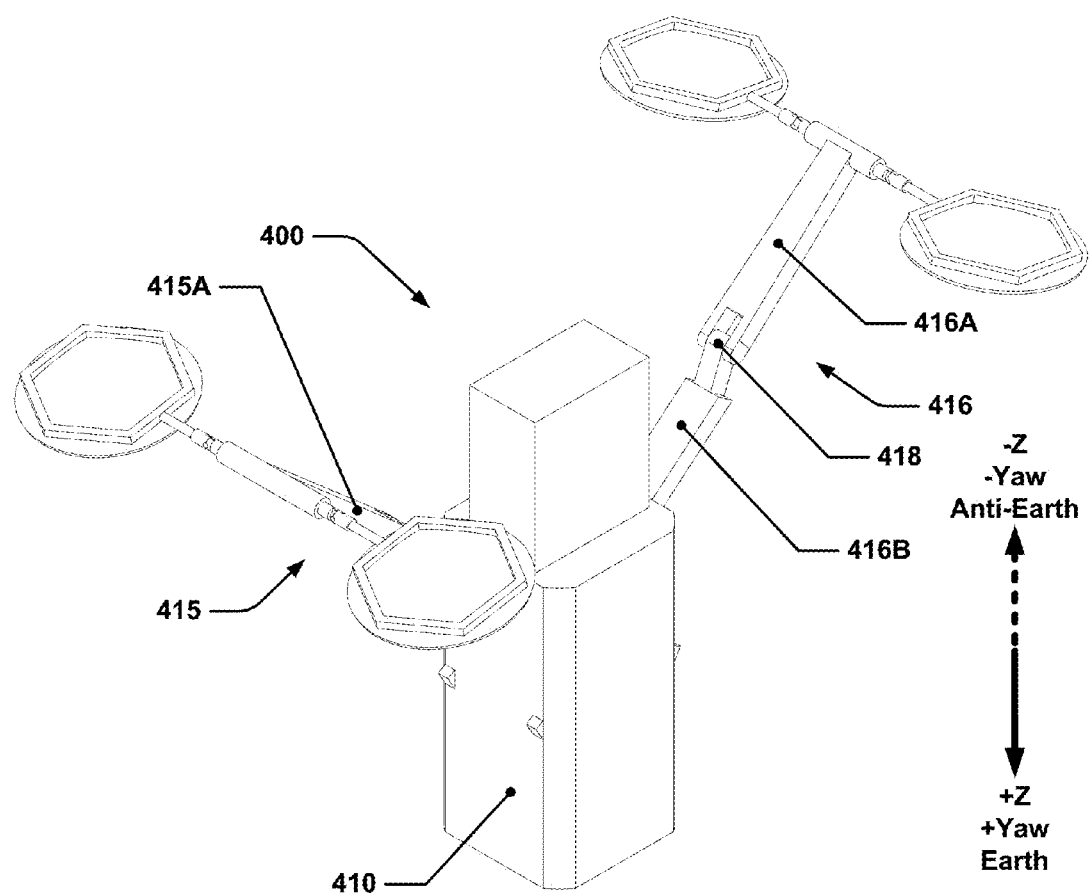
FIG. 4D depicts the satellite embodiment of FIG. 4A in the on-orbit configuration.

FIG. 3A depicts a side view of satellite 200 within sectioned conceptual delivery vehicle fairing envelope 310. FIG. 3B depicts another side view of satellite 200 within sectioned conceptual delivery vehicle fairing envelope 310.

FIGS. 4A-4D depict an "inverted" satellite embodiment in which forward surface 450 faces in the zenith direction when the satellite is on-orbit. Satellite 400 features components which are similar to those shown in FIGS. 2A-2D, although first pivot 411 and the second pivot (not shown) have been relocated to be closer to the forward surface than the aft surface, first reflector boom 415 includes first hinge 417 which divides the reflector boom into first portion 415A and second portion 415B, and second reflector boom 416 includes second hinge 418 which divides second reflector boom into first portion 416A and second portion 416B. First portions 415A and 416A may also be referred to as "outboard portions." Second portions 415B and 416B may similarly be referred to as "inboard portions."

To transition satellite 400 from the launch configuration to the on-orbit configuration, similar operations to those performed with respect to satellite 200 in FIGS. 2A-2D may be performed, albeit with additional rotation operations with respect to first reflector boom 415 and second reflector boom 416. For example, first portion 415A of first reflector boom 415 may be rotated away from second portion 415B of first reflector boom 415 as part of the overall rotation of first reflector boom 415 away from main body 410. Similar operations may be performed with respect to second reflector boom 416.

Although several embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

We claim:

1. A spacecraft, the spacecraft being reconfigurable between a launch configuration and an on-orbit configuration, the spacecraft comprising:
    a forward surface and an aft surface, each substantially orthogonal to the spacecraft yaw axis;
    a main body disposed between the forward surface and the aft surface;
    a first rigid antenna reflector, the first rigid antenna reflector coupled with a first positioning mechanism and associated with a first antenna feed, the first antenna feed configured to illuminate the first rigid antenna reflector when the spacecraft is in the on-orbit configuration; and
    a first reflector boom with a first proximal end and a first distal end, the first proximal end coupled with the main body via a first pivot mechanism and the first distal end coupled with the first rigid antenna reflector via the first positioning mechanism, wherein:
        the first reflector boom is configured to rotate about a rotational axis of the first pivot mechanism,
        in the launch configuration, the aperture plane of the first rigid antenna reflector is substantially normal to the rotational axis of the first pivot mechanism, and a substantial portion of the first rigid antenna reflector is forward of the forward surface and inboard of a side of the main body, and
        in the on-orbit configuration, the first reflector boom is at a substantial angle with respect to the main body, the aperture plane of the first rigid antenna reflector is substantially parallel to the rotational axis of the first pivot, the first rigid antenna reflector is illuminated by the first antenna feed, and the first rigid antenna reflector is displaced a substantial distance from the main body in the yaw axis direction and in a direction orthogonal to the yaw axis direction.

2. The spacecraft of claim 1, wherein the first positioning mechanism is configured to rotate the first antenna reflector relative to the first reflector boom.

3. The spacecraft of claim 1, wherein, in the launch configuration, the first reflector boom is substantially proximate to and substantially parallel to the main body.

4. The spacecraft of claim 1, wherein, in the launch configuration, the aperture plane of the first rigid antenna reflector is substantially normal to the rotational axis of the first pivot mechanism.

5. The spacecraft of claim 1, further comprising:
    a second rigid antenna reflector, the second rigid antenna reflector coupled with a second positioning mechanism and associated with a second antenna feed, the second antenna feed configured to illuminate the second rigid antenna reflector when the spacecraft is in the on-orbit configuration; and
    a second reflector boom with a second proximal end and a second distal end, the second proximal end coupled with the main body via a second pivot mechanism and substantially opposite of the first pivot and the second distal end coupled with the second rigid antenna reflector via the second positioning mechanism, wherein:
        the second reflector boom is configured to rotate about a rotational axis of the second pivot mechanism,
        in the launch configuration, the aperture plane of the second rigid antenna reflector is substantially normal to the rotational axis of the second pivot mechanism, and a substantial portion of the second rigid antenna reflector is forward of the forward surface and inboard of a side of the main body, and
        in the on-orbit configuration, the second reflector boom is at a substantial angle with respect to the main body, the aperture plane of the second rigid antenna reflector is substantially parallel to the rotational axis of the second pivot, the second rigid antenna reflector is illuminated by the second antenna feed, and the second rigid antenna reflector is displaced a substantial distance from the main body in the yaw axis direction and in a direction orthogonal to the yaw axis direction.

6. The spacecraft of claim 5, comprising:
    a third rigid antenna reflector, the third rigid antenna reflector coupled with a third positioning mechanism and associated with a third antenna feed configured to illuminate the third rigid antenna reflector when the spacecraft is in the on-orbit configuration, wherein the third rigid antenna reflector is coupled with the first distal end via the third positioning mechanism; and a fourth rigid antenna reflector, the fourth rigid antenna reflector coupled with a fourth positioning mechanism and associated with a fourth antenna feed configured to illuminate the fourth rigid antenna reflector when the spacecraft is in the on-orbit configuration, wherein the fourth rigid antenna reflector is coupled with the second distal end via the fourth positioning mechanism, wherein:
  in the launch configuration, the aperture planes of the third rigid antenna reflector and the fourth rigid antenna reflector are substantially normal to the rotational axes of the first pivot mechanism and the second pivot mechanism, repspectively, and a substantial portion of the third rigid antenna reflector and a substantial portion of the fourth rigid antenna reflector are forward of the forward surface and inboard of a side of the main body, and
  in the on-orbit configuration, the aperture planes of the third rigid antenna reflector and the fourth rigid antenna reflector are substantially parallel to the rotational axes of the first pivot mechanism and the second pivot mechanism, respectively, the third rigid antenna reflector is illuminated by the third antenna feed, the fourth rigid antenna reflector is illuminated by the fourth antenna feed, and the third rigid antenna reflector and the fourth rigid antenna reflector are displaced a substantial distance from the main body in the yaw axis direction and in directions orthogonal to the yaw axis direction.

7. The spacecraft of claim 6, further comprising:
a first crossboom, the first crossboom connected with the first positioning mechanism at a first end of the first crossboom, the first crossboom connected with the third positioning mechanism at a second end of the first crossboom, and the first crossboom connected with the first distal end between the first end and the second end of the first crossboom, wherein the first rigid antenna reflector and the third rigid antenna reflector are coupled with the first distal end via the first crossboom; and
a second crossboom, the second crossboom connected with the second positioning mechanism at a first end of the second crossboom, the second crossboom connected with the fourth positioning mechanism at a second end of the second crossboom, and the second crossboom connected with the second distal end between the first end and the second end of the second crossboom, wherein the second rigid antenna reflector and the fourth rigid antenna reflector are coupled with the second distal end via the second crossboom.

8. The spacecraft of claim 1, wherein the first positioning mechanism is configured to provide dual-axis rotation.

9. The spacecraft of claim 1, wherein:
in the launch configuration, the first rigid antenna reflector is forward of the first antenna feed, and
in the on-orbit configuration, the first rigid antenna reflector is aft of the first antenna feed.

10. The spacecraft of claim 1, further comprising:
a first stiffener strut, wherein a first end of the first stiffener strut is coupled with the first reflector boom between the first distal end and the first proximal end and a second end of the first stiffener strut is coupled with the main body at a location other than where the first pivot is connected.

11. The spacecraft of claim 10, wherein the first stiffener strut is selected from the group consisting of a bifold strut, a sliding strut with the first or second end slidably connected with a fixed pivot on the first reflector boom or the main body, respectively, and a fixed strut with the first or second end coupled with a sliding pivot on the first reflector boom or the main body, respectively.

12. The spacecraft of claim 1, wherein, in the launch configuration, the first distal end extends forward of the forward surface.

13. The spacecraft of claim 1, wherein the aft surface includes a launch vehicle mating interface, and wherein the spacecraft is configured to orient the forward surface in the nadir direction in the on-orbit configuration.

14. The spacecraft of claim 1, wherein the aft surface comprises a launch vehicle mating interface, and wherein the spacecraft is configured to orient the aft surface in the nadir direction in the on-orbit configuration.

15. The spacecraft of claim 1, wherein the spacecraft is configured to orient the first pivot mechanism and the first reflector boom west in the on-orbit configuration.

16. The spacecraft of claim 10, wherein the first reflector boom includes a first hinge located between the first distal end and the first proximal end, wherein
  an outboard portion of the first reflector boom is rotatable about the first hinge rotational axis with respect to an inboard portion of the first reflector boom,
  in the launch configuration, the outboard portion of the first reflector boom between the first distal end and the first hinge forms an acute angle with respect to the inboard portion of the first reflector boom between the first proximal end and the first hinge, and
  in the on-orbit configuration, the outboard portion of the first reflector boom forms an angle substantially greater than 90° with respect to the inboard portion of the first reflector boom and at least a substantial portion of the outboard portion is forward of the forward surface.

17. The spacecraft of claim 5, further comprising:
a third rigid antenna reflector, the third rigid antenna reflector coupled with a third positioning mechanism and associated with a third antenna feed configured to illuminate the third rigid antenna reflector when the spacecraft is in the on-orbit configuration;
a third reflector boom with a third proximal end and a third distal end, the third proximal end coupled with the main body via a third pivot mechanism and the third distal end coupled with the third rigid antenna reflector via the third positioning mechanism;
a fourth rigid antenna reflector, the fourth rigid antenna reflector coupled with a fourth positioning mechanism and associated with a fourth antenna feed configured to illuminate the fourth rigid antenna reflector when the spacecraft is in the on-orbit configuration; and
a fourth reflector boom with a fourth proximal end and a fourth distal end, the fourth proximal end coupled with the main body via a fourth pivot mechanism and the fourth distal end coupled with the fourth rigid antenna reflector via the fourth positioning mechanism, wherein:
  the third reflector boom is configured to rotate about the third pivot mechanism, the third positioning mechanism is configured to rotate the third rigid antenna reflector,
  the fourth reflector boom is configured to rotate about the fourth pivot mechanism, the fourth positioning mechanism is configured to rotate the fourth rigid antenna reflector,
  in the launch configuration, the third reflector boom and the fourth reflector boom are substantially proximate and substantially parallel to the main body, the aperture planes of the third rigid antenna reflector and the fourth rigid antenna reflector are substantially normal to the rotational axes of the third pivot mechanism and the fourth pivot mechanism, respectively, and a substantial portion of the third rigid antenna reflector and a substantial portion of the fourth rigid antenna reflector are forward of the forward surface and inboard of a side of the main body, and in the on-orbit configuration, the aperture planes of the third rigid antenna reflector and the fourth rigid antenna reflector are substantially parallel to the rotational axes of the third pivot mechanism and the fourth pivot mechanism, respectively, the third reflector boom is at a substantial angle with respect to the main body, the fourth reflector boom is at a substantial angle with respect to the main body, the third rigid antenna reflector is illuminated by the third antenna feed, the fourth rigid antenna reflector is illuminated by the fourth antenna feed, and the third rigid antenna reflector and the fourth rigid antenna reflector are displaced a substantial distance from the main body in the yaw axis direction and in a direction orthogonal to the yaw axis direction.

18. The spacecraft of claim 1, wherein the first rigid antenna reflector is characterized by a focal length, the focal length being no less than an axial length of the main body along the yaw axis.

19. The spacecraft of claim 1, wherein the first antenna feed is approximately midway between the forward surface and the aft surface.

20. A rigid antenna reflector deployment mechanism reconfigurable between a launch configuration and an on-orbit configuration, the deployment mechanism comprising:
   a first rigid antenna reflector;
   a reflector boom, the reflector boom including a proximal end and a distal end;
   a first positioning mechanism connecting the first rigid antenna reflector to the distal end;
   and
   a pivot mechanism with a first portion and a second portion, the first portion configured to pivot relative to the second portion, the first portion coupled with the proximal end, and the second portion configured to attach to a main body of a spacecraft, wherein the rigid antenna reflector deployment mechanism is configured such that:
      the pivot mechanism rotates the reflector boom about the pivot mechanism rotational axis,
      in the launch configuration, the aperture plane of the first rigid antenna reflector is substantially normal to the rotational axis of the pivot mechanism, and the rigid antenna reflector deployment mechanism is configured such that a substantial portion of the first rigid antenna reflector is forward of a forward surface of the spacecraft and inboard of a side of the main body, and
      in the on-orbit configuration, the rigid antenna reflector deployment mechanism is configured such that the reflector boom is at a substantial angle with respect to the main body, the first rigid antenna reflector is illuminated by a first antenna feed on the spacecraft, and the first rigid antenna reflector is displaced a substantial distance from the main body in the yaw axis direction and in a direction orthogonal to the yaw axis direction.

21. The rigid antenna reflector deployment mechanism of claim 20, wherein the first positioning mechanism is a dual-axis positioning mechanism.

22. The rigid antenna reflector deployment mechanism of claim 20, further comprising:
   a second rigid antenna reflector; and
   a second positioning mechanism, the second positioning mechanism connecting the second rigid antenna reflector to the distal end, wherein the rigid antenna reflector deployment mechanism is configured such that:
      the second positioning mechanism rotates the second rigid antenna reflector,
      in the launch configuration, the aperture plane of the second rigid antenna reflector is substantially normal to the rotational axis of the pivot mechanism, and the rigid antenna reflector deployment mechanism is configured such that a substantial portion of the second rigid antenna reflector is forward of the forward surface and inboard of a side of the main body, and
      in the on-orbit configuration, the rigid antenna reflector deployment mechanism is configured such that the second rigid antenna reflector is illuminated by a second antenna feed on the spacecraft and the second rigid antenna reflector is displaced a substantial distance from the main body in the yaw axis direction and in a direction orthogonal to the yaw axis direction.

23. The rigid antenna reflector deployment mechanism of claim 22, wherein the first positioning mechanism and the second positioning mechanism are configured, in the launch configuration, to orient the first rigid antenna reflector and the second rigid antenna reflector, respectively, in opposite directions.

24. The rigid antenna reflector deployment mechanism of claim 22, wherein the distal end includes a crossboom, wherein the crossboom is substantially orthogonal to the reflector boom, wherein the first positioning mechanism is coupled with a first end of the crossboom, and wherein the second positioning mechanism is coupled with the second, opposite end of the crossboom.

25. The rigid antenna reflector deployment mechanism of claim 20, further comprising a stiffener strut, wherein a first end of the stiffener strut is coupled with the reflector boom between the distal end and the proximal end, and wherein the second end of the stiffener strut is configured to be coupled with the main body at a location other than where the pivot mechanism is configured to be connected.

26. The rigid antenna reflector deployment mechanism of claim 20, wherein the reflector boom includes a first hinge located between the distal end and the proximal end, wherein, when the rigid antenna reflector deployment mechanism is in the launch configuration, the reflector boom is configured to be folded about the hinge such that a first portion of the reflector boom between the distal end and the hinge is drawn against a second portion of the reflector boom between the proximal end and the hinge, and wherein the reflector boom is configured, when the rigid antenna reflector deployment mechanism is in the on-orbit configuration, to be unfolded about the hinge such that the first portion of the reflector boom forms an angle substantially greater than 90° with the second portion.

27. The rigid antenna reflector deployment mechanism of claim 20, wherein the first rigid antenna reflector is characterized by a focal length, the focal length being no less than an axial length of the main body along the yaw axis.

28. A method of reconfiguring a rigid antenna reflector deployment mechanism of a spacecraft from a launch configuration to an on-orbit configuration, the spacecraft including a main body, a forward surface, and an aft surface, the main body located substantially between the forward surface and the aft surface, and the deployment mechanism comprising:
- a first rigid antenna reflector;
- a reflector boom, the reflector boom including a proximal end and a distal end;
- a first positioning mechanism connecting the first rigid antenna reflector to the distal end; and
- a pivot mechanism with a first portion and a second portion, the first portion configured to pivot relative to the second portion about a pivot mechanism rotational axis, the first portion coupled with the proximal end, and the second portion configured to attach to a main body of a spacecraft, wherein the rigid antenna reflector deployment mechanism is configured such that:
  - the reflector boom is rotatable about the pivot mechanism rotational axis,
  - in the launch configuration, the aperture plane of the first rigid antenna reflector is substantially normal to the pivot mechanism rotational axis, and the rigid antenna reflector deployment mechanism is configured such that a substantial portion of the first rigid antenna reflector is forward of the forward surface of the spacecraft and inboard of a side of the main body, and
  - in the on-orbit configuration, the rigid antenna reflector deployment mechanism is configured such that the reflector boom is at a substantial angle with respect to the main body, the first rigid antenna reflector is illuminated by a first antenna feed on the spacecraft, and the first rigid antenna reflector is displaced a substantial distance from the main body in the yaw axis direction and in a direction orthogonal to the yaw axis direction, wherein the method comprises:
    - rotating the first rigid antenna reflector away from the spacecraft yaw axis while the first rigid antenna reflector is positioned forward of the forward surface of the spacecraft;
- rotating the reflector boom away from the main body; and
- rotating the first rigid antenna reflector further away from the spacecraft yaw axis.

* * * * *